United States Patent [19]

Roemer

[11] 3,950,141

[45] Apr. 13, 1976

[54] SLIDING FRICTION BEARINGS

[75] Inventor: Erich B. Roemer, Wiesbaden, Germany

[73] Assignee: Glyco-Metall-Werke Daden & Loos GmbH, Wiesbaden, Germany

[22] Filed: Nov. 19, 1973

[21] Appl. No.: 418,276

Related U.S. Application Data

[63] Continuation-in-part of Ser. No. 193,036, Oct. 27, 1971, abandoned.

[30] Foreign Application Priority Data

Nov. 2, 1970 Germany............................ 2053696

[52] U.S. Cl. ............. 29/196.2; 29/196.3; 29/196.4; 29/197
[51] Int. Cl....................... B32b 15/18; B32b 15/20
[58] Field of Search ....... 29/196.3, 196.2, 197, 194, 29/196.4

[56] References Cited
UNITED STATES PATENTS

| 2,386,951 | 10/1945 | Howe | 29/196.3 |
|---|---|---|---|
| 2,459,172 | 1/1949 | Luetkemeyer | 29/196.3 |
| 2,465,329 | 3/1949 | Murray | 29/196.3 |
| 2,586,100 | 2/1952 | Schultz | 29/196.2 |
| 2,715,259 | 8/1955 | Mohler | 29/196.4 |
| 2,970,933 | 2/1961 | Barera | 29/196.3 |
| 3,221,392 | 12/1965 | Gould | 29/196.2 |
| 3,251,119 | 5/1966 | Kingsbury | 29/196.3 |
| 3,307,926 | 3/1967 | Thomas et al. | 29/196.4 |
| 3,403,010 | 9/1968 | MacDonald | 29/196.3 |

Primary Examiner—L. Dewayne Rutledge
Assistant Examiner—Arthur J. Steiner
Attorney, Agent, or Firm—Barnes, Kisselle, Raisch & Choate

[57] ABSTRACT

A composite bearing comprising a backing layer, an intermediate layer of a good heat conducting, medium modulus of elasticity metal on said backing layer having a Vickers Hardness (Diamond Pyramid Hardness) in the range between approximately 30 [$kp/mm^2$] and 100 [$kp/mm^2$] and a thickness in the range between approximately 0.2 and 0.7 mm (0.001 and 0.03 inch). A first bearing layer is provided as the main surface layer on said intermediate layer having a thickness of more than 0.0025 mm (0.0001 inch) and not more than 0.1 mm (0.004 inch) preferably in the range between 0.003 mm to 0.01 mm (0.00012 to 0.0004 inch) and consisting of a bearing metal having a Vickers hardness (Diamond Pyramid Hardness) of at least 200 [$kp/mm^2$]. An additional surface layer is provided over said first bearing layer as a running-in layer having a thickness of not more than 0.05 mm (0.002 inch) and consisting of a bearing metal alloy having a Vickers hardness (Diamond Pyramid Hardness) in the range between approximately 4 [$kp/mm^2$] and 30 [$kp/mm^2$].

19 Claims, 3 Drawing Figures

U.S. Patent   April 13, 1976   3,950,141
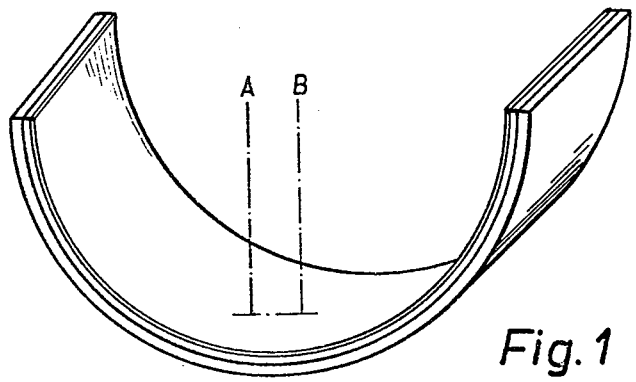
Fig. 1
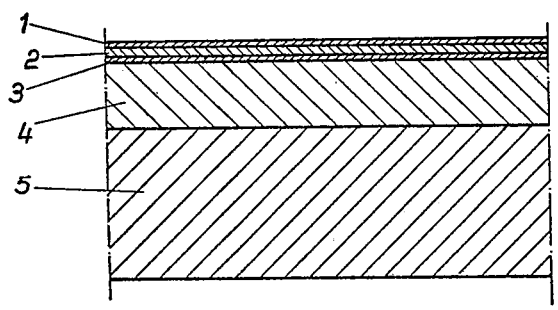
Fig. 2
Fig. 3
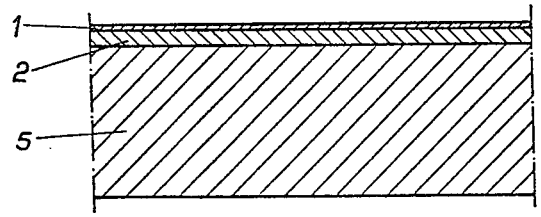

SLIDING FRICTION BEARINGS

This application is a continuation-in-part of application Ser. No. 193,036, filed Oct. 27, 1971, now abandoned.

The invention relates to sliding friction bearings consisting of at least three layers of metallic materials, of which one layer is designed to face the journal as a bearing liner.

In internal combustion engines with a high specific output, so-called three-component bearings are generally used nowadays as main and connecting rod bearings. Such three-component bearings consist of three layers of metal, increasingly softer materials being used from the outside inwards, in other words towards the working surface. The most frequent constructions of such known bearings are a supporting shell of steel, over this a layer of lead bronze and on this a thin galvanically applied overlay of lead with approximately 10% tin and/or indium and in some cases some copper. In the case of other currently used constructions of such three-component bearings, the lead bronze is replaced by an aluminum alloy. The lead bronze layer or the layer of aluminum alloy is generally 0.2 to 0.7 mm thick. The layer of soft metal galvanized thereon is generally 0.01 to 0.03 mm thick. Only in the case of sliding friction bearings for relatively large engines are the thicknesses of the layers likewise larger corresponding to the increased bearing dimensions. Between the lead bronze layer and the galvanically applied overlay, a layer of nickel having a 0.001 mm thickness is often used. This extremely thin layer is only a diffusion barrier and cannot serve as an overlay. The supporting shell generally has a Brinell hardness of between 100 and 230. The lead bronze or aluminum alloy generally has a Brinell hardness of between 30 and 90. The galvanically applied layers generally have Brinell hardnesses of between 5 and 10, this hardness not being measured on the thin layers themselves but on similarly manufactured alloys of the same composition.

Also in the case of other sliding friction bearings in internal combustion engine construction or even engineering, heavily-loaded sliding friction bearings which are operated at speeds of over 5 m/sec., are always so constructed that increasingly softer materials are used towards the working surface.

The choice of materials is based on the emergency running properties required of the individual layers and, furthermore, the soft layers achieve a ready adaptation to the journal. In the case of three-component bearings, an intermediate layer of a bearing material was chosen, since it was assumed that at high localized loadings, a plastic deformation of the lead bronze or aluminum alloy could take place, to facilitate adaptation to the journals, without destruction of the thin galvanized-on overlay. In practice, however, it was found that this adaptation by plastic deformation of the intermediate layer did not occur, since the wear emanating from the surface of the overlay or the surface of the journal proceeds far more rapidly, so that adaptation is achieved only by wear which entails an increase in bearing clearance. However, an increase in bearing clearance is normally undesired. The intermediate layer, however, still has the task of serving as a substitute overlay once the thin and very soft overlay has been completely worn out. Nevertheless, this is possible only for a limited degree, since the sliding friction properties of this intermediate layer are substantially inferior to those of the actual overlay. Tests have shown that a thicker overlay leads even more rapidly to destruction of the bearings.

In contrast thereto the invention is directed to the problem of providing sliding friction bearings of the type described, in which adoption of the bearing to the journals or shafts or other moving elements is achieved substantially or at least to a large extent by plastic deformation of a layer of material located beneath the main bearing layer.

Accordingly an important object of the invention is to provide a composite bearing having a very hard first or main bearing layer, such first bearing layer having a thickness within a range in which such hard bearing layer is able to support a journal or a shaft or other element but thin enough to be pressed backwardly within a small part of its surface if any hard particle will get between the said layer surface and the said journal or shaft or other element surface. Furthermore an important part of the invention is that the surface of said very hard main bearing layer adjacent to said journal or shaft or other element surface should be as smooth as possible.

Therefore it is a further object of the invention to provide a composite bearing of the kind as mentioned above, in which the main bearing layer constructed as a hard layer of small thickness is backed by a layer of material of substantially lesser hardness and is covered on the working surface with a smooth and soft running-in layer.

Further it is an object of the invention to provide a composite bearing of the above mentioned type in which the hard actual main bearing layer carries a running-in layer, which in its material may essentially correspond to the overlay of the previous bearings although it is made substantially thinner.

It is another object of the invention to provide a composite bearing of the type as mentioned above in which one or a plurality of diffusion carrier layers is provided in a thickness of some 0.001 mm between the main bearing layer and the intermediate layer or between the main bearing layer and the running-in layer respectively.

Within the scope of the invention, the very hard supporting main bearing layer should have a Diamond Pyramid Hardness of at least 200 (or comparable Rockwell-C-Hardness of 12 to 13), preferably between about 600 and 900 (Rockwell-C-Hardness between 55 and 67). The thickness of the hard main bearing layer may be at maximum of some 0.1 mm, preferably some 0.005 mm to 0.01 mm. In the preferred embodiment of the invention, the hard main bearing layer consists for example of a nickel-tin alloy with a tin content between approximately 30% and 90%, e.g. 35% nickel and 65% tin.

It is a further object of the invention to provide a composite bearing of the kind as mentioned above having an intermediate layer between the main bearing layer, said intermediate layer consisting of any metallic bearing material having a Brinell hardness of approximately between 30 and 100, for example lead bronze, tin bronze and lead-tin bronzes, copper-lead, aluminum alloys or pure aluminum in cast or sintered form.

It is another object of the invention to provide a composite bearing of the kind as mentioned above having said main bearing layer directly on a supporting shell, said supporting shell consisting of metallic material having a Brinell hardness between approximately 100 and 250, e.g. consisting of steel or aluminum alloy. Also in such a case the main bearing layer is still substantially harder than the layer beneath it, that means harder than the supporting shell of the bearing.

It is a further important particular feature of the invention for the choice of materials for the main bearing layer that substantial alloy components are provided which are able to form intermetallic compounds. Such intermetallic compounds are chemically relatively stable and the risk of a reaction with the steel surface of the journal or shaft or other element is therefore correspondingly small. It is not necessary that the intermetallic compounds already exist at the time when the layer is manufactured; instead, these intermetallic compounds may be formed by a subsequent heat treatment or while the bearing is heated through use.

For example in the case of the above mentioned galvanic precipitation of Ni Sn, a main bearing layer my be formed having a Diamond pyramid hardness of approximately 600 (Rockwell-C-Hardness of approximately 55), which gives me reason to suppose that already intermetallic compounds, e.g. $Ni_3Sn$, $Ni_3Sn_2$, $Ni_3Sn_4$, have formed at least in small areas. Thermal treatments result in changes taking place without a state of equilibrium being attained within industrially justified temperatures and tempering times. However, it is also possible galvanically to precipitate Ni and Sn separately and to achieve the formation of intermetallic bonds by a subsequent heat treatment. An additional Cu content in the Ni-Sn alloy may be advantageous.

Investigations of the running properties of such an alloy have shown that an additional thin running-in layer is necessary in order to allow practical use at high loadings and sliding friction speeds in excess of 5 m/sec.

A running-in layer of 0.002 mm to 0.003 mm consisting of 87% Pb, 10% Sn and 3% Cu has already provided good running results. For practical applications, a thickness of some 0.005 to 0.015 mm would seem expedient.

For this running-in layer, it is possible for example, also to use lead or tin or cadmium alloys with tin, copper, indium and similar additives.

If the sliding friction bearings according to the invention are, in known manner, for bearing and transport purposes, to be provided at least partially with an anti-corrosion coating comprising a galvanically produced layer of lead and/or tin or an alloy thereof, then, within the framework of the invention, this anti-corrosion coating must be constructed in the thickness of not more than approx. 0.003 mm.

Two embodiments of the invention are illustrated in greater detail and by way of example hereinafter with reference to the attached drawings, in which:

FIG. 1 is a sliding friction bearing shell according to the invention, in a perspective view;

FIG. 2 is a portion A-B of a preferred embodiment of the bearing shell according to FIG. 1, greatly enlarged and in cross-section, and FIG. 3 is the portion A-B in FIG. 1, but of another possible embodiment of the invention, shown greatly enlarged and in cross-section.

In the example shown in FIG. 1, a steel supporting shell 5 has on it an intermediate layer 4 of lead bronze to a layer thickness ranging between 0.2 mm to 0.7 mm. This intermediate layer 4 has a Brinell hardness between approximately 50 and 100. Applied on the intermediate layer 4 is an extremely thin (thickness 0.001 to 0.002 mm) layer of nickel which is intended to serve as a diffusion barrier, as in the case of conventional three-component bearings. Applied galvanically over the diffusion barrier layer 3 is a very hard supporting main bearing layer 2 consisting of a nickel tin alloy of approximately 65% tin and 35% nickel. The thickness of this main bearing layer 2 in the example illustrated is 0.006 mm to 0.008 mm. The hardness of this overlay 2 is around 600 to 900 Diamond Pyramid hardness (comparable with Rockwell-C-hardness 55 to 67). Likewise galvanically applied on the said main bearing layer 2 is a running-in layer 1 as a second overlay consisting of a lead-tin-copper alloy of 10% tin, 3% copper, remainder lead, with a thickness of 0.006 mm and a Brinell hardness of about 10.

This bearing construction was tested with conventional three-component bearings in tests under bearing loadings of 500 kp/cm$^2$ and 700 kp/cm$^2$ and oil temperatures of approximately 120°C and 150°C. During these tests, each of which extended over 250 running hours the bearings according to the invention clearly demonstrated themselves to be substantially superior to the conventional three-component bearings. Whereas, in the case of the conventional three-component bearings, fatigue cracks became visible in the galvanized lead layer, no such cracks could be observed in the above-described bearings according to the invention. Also, wear of the bearings according to the invention was extremely small. Furthermore, it was established that the abatement in initial tension and spreading of these bearings was quite substantially reduced in comparison with conventional three-component bearings. (The term spreading is intended to imply that bearing half-shells are constructed with a larger diameter over the parting lines than measured over the apex. When a half-shell is fitted, therefore, a certain tension is present so that the half-shells adhere in the bore merely by insertion. This guarantees perfect fitment of sliding friction bearings and is therefore extremely important for repair work or overhauls of bearings, e.g. after test runs).

In order to understand the above-mentioned advantageous effects which are achieved by the invention it is believed that the hard overlay of nickel-tin alloy, despite its small thickness and by virtue of its very high strength, prevents in the overlay changes which could lead to fatigue and therefore by crumbling or other changes in the overlay.

Furthermore, investigations with an extremely thin running-in layer (approximately 0.002 mm) have revealed that the wear caused on the journal, once the hard overlay has been exposed, is extremely small, in fact smaller than with conventional three-component bearings. In addition, the bearings referred to in the exemplary embodiment displayed good resistance to corrosion and cavitation, likewise more favorably than conventional three-component bearings.

Further I found by special experiments that there is a very surprising effect of my invention that when using an extremely hard first bearing layer in combination with an additional surface layer having a small thickness and being made of very soft bearing metal there are achieved extremely low wearing conditions not only at the bearing surface itself but surprisingly especially at the surface of a member such as a shaft running in such a bearing. Such extremely low wearing conditions are especially maintained also under high loading and fast driving conditions at the bearing and the running member surfaces.

Instead of the nickel-tin alloy, it is also possible to use another high-strength alloy, so long as this has suitable sliding friction properties. The Diamond Pyramid hardness of the said very hard supporting main bearing layer 2 ought however to be at least 200 (comparable Rockwell-C-Hardness 12 to 13). In the above-mentioned example, on grounds of manufacture, the thickness of the main bearing layer 2 was chosen between 0.006 mm and 0.008 mm. It is however entirely possible for the hard overlay 2 to be used up to a thickness of approximately 0.1 mm.

Also the layers beneath the hard bearing layer 2 may consist of any kind of alloys. It is therefore possible, as bearing material, to use known alloys, for example tin bronzes, lead-tin bronzes, but also for bearing purposes, to use known aluminum alloys or even pure aluminum for the intermediate layer 4. In these cases, the Brinell hardness of this intermediate layer material is between approximately 30 and 100.

FIG. 3 shows an example of a sliding friction bearing construction such as is likewise conceivable within the scope of the invention. In this example, a hard bearing layer 2 of approximately 0.1 mm thickness, is applied directly onto the supporting shell 5 of the bearing. In this example, the supporting shell 5 consists of a soft steel normally used for this purpose, with a Brinell hardness of for example 100 to 250, while the overlay 2, as in the example in FIG. 2, may consist of nickel-tin alloy and have a Diamond Pyramid Hardness between some 600 and 900 (comparable Rockwell-C-Hardness 55 to 67). In such a case the hardness of the main bearing layer is still substantially greater than the hardness of the supporting shell 5 beneath it. On the main bearing layer 2, in this example also, there is a running-in layer 1 which may be constructed in the same manner as discussed in connection with example shown in FIG. 2.

If desired, the supporting shell 5 may consist of any appropriate aluminum alloy having a hardness in the range or lower than as mentioned above for the steel shell. Instead of the steel or aluminum alloy supporting shell more than about Brinell hardness 60, it is possible in the last-mentioned example also to use the machine part directly. For example, therefore, a hard Ni-Sn layer may be applied galvanically directly into the bore of a connecting rod and the running-in layer applied thereon. Dispensing with the intermediate layer of bearing metal between the steel body and the hard main bearing layer does however considerably reduce the ability of the bearing to tolerate particles of dirt which may pass into the bearing gap with the stream of oil.

Alternatively, the main bearing layer may consist essentially of nickel in which very hard fine particles or corundum or carborundum or a mixture of both fine particles are embedded. The amount of fine hard particles embedded in the nickel layer may be chosen in order to get a desired medium Brinell hardness ranging between 400 and 800. The mixture of nickel metal and embedded hard particles may be spread onto the above described backing layer or the above described intermediate layer.

The manufacture of the aforesaid hard bearing layer is by no means limited to galvanic processes, but also other processes for applying thin layers, such as vaporization, sputtering, etc. are entirely suitable.

The Brinell hardness numbers mentioned in this specification relate to impressions with a 10 mm steel ball and 3000 kg load. The Diamond Pyramid hardness numbers relate to a 136° Pyramid tip and 10 kg load. The Rockwell-C-Hardness scale relates to using testing brale and a final testing load of 150 kg. It is to be understood that the normal methods for testing the hardness of the several very thin layers are not able to be used. Therefore I used micro-fine testing bodies and corresponding reduced loads for hardness testing. The values obtained by such testing I transferred mathematically onto the normal hardness scales as mentioned above.

I claim:

1. A composite bearing comprising a backing layer, an intermediate layer of a good heat conducting, medium modulus of elasticity metal on said backing layer having a Vickers hardness (Diamond Pyramid Hardness) in the range between approximately 30 (kp/mm$^2$) and 100 (kp/mm$^2$) and a thickness in the range between approximately 0.2 and 0.7 mm (0.001 and 0.03 inch), a first bearing layer as the main surface layer on said intermediate layer having a thickness of more than 0.0025 mm (0.0001 inch) and not more than 0.1 mm (0.004 inch) preferably in the range between 0.003 mm to 0.01 mm (0.00012 to 0.0004 inch) and consisting of an alloy of nickel and tin having a tin content between approximately 30% and 90%, the remainder being nickel and having a Vickers hardness (Diamond Pyramid Hardness) of at least 200 (kp/mm$^2$), and an additional surface layer over said first bearing layer as a running-in layer having a thickness of not more than 0.05 mm (0.002 inch) and consisting of a bearing metal alloy having a Brinell hardness in the range between approximately 4 (kp/mm$^2$) and 30 (kp/mm$^2$).

2. The composite bearing according to claim 1 wherein the Vickers hardness of said first bearing layer is preferably in the range between approximately 600 and 900.

3. A composite bearing according to claim 1, characterized in that the said first bearing layer comprises at least for the most part intermetallic compounds between nickel and tin.

4. A composite bearing according to claim 1 wherein said tin comprises preferably 65% to 70%.

5. A composite bearing according to claim 1, characterized in that the said intermediate layer consists of a material selected from the group consisting of lead bronzes, tin bronzes, lead-tin bronzes, aluminum alloys and pure aluminum.

6. A composite bearing according to claim 1, characterized in that the said backing layer comprises steel or aluminum alloy.

7. A composite bearing according to claim 1, characterized in that an additional galvanically precipitated barrier layer of nickel having a thickness of not more than 0.005 mm, is provided between the said first bearing layer and the said intermediate layer.

8. A composite bearing layer according to claim 7 wherein the thickness of said additional barrier layer is preferably 0.001 to 0.002 mm.

9. A composite bearing according to claim 1, characterized in that the said additional surface layer as a running-in layer has a thickness in the range between 0.005 mm and 0.015 mm (0.0002 to 0.0006 inch).

10. A composite bearing according to claim 1, characterized in that the said additional surface layer as a running-in layer is selected from the group consisting of lead or an alloy of lead, tin and cadmium as its main ingredient and has a Vickers hardness (Diamond Pyramid hardness) in the range between approximately 5 and 10.

11. A composite bearing according to claim 1, characterized in that the said additional surface layer as a running-in layer comprises lead, up to 20% tin or indium and a maximum of 6% copper.

12. A composite bearing comprising a backing layer comprising a metallic material having a Vickers hardness (Diamond Pyramid Hardness) in the range between approximately 100 (kp/mm$^2$) and 250 (kp/mm$^2$), a first bearing layer as the main surface layer more than 0.0025 mm (0.0001 inch) having a thickness of not more than 0.1 mm (0.004 inch) and consisting of an alloy of nickel and tin having a tin content between approximately 30% and 90%, the remainder being nickel and having a Vickers hardness (Diamond Pyramid Hardness) of at least 200 (kp/mm$^2$), and an additional surface layer over said first bearing layer as a running-in layer having a thickness of not more than 0.05 mm (0.002 inch) and consisting of a bearing metal alloy having a Brinell hardness in the range between approximately 4 (kp/mm$^2$) and 30 (kp/mm$^2$).

13. A composite bearing according to claim 12 wherein the thickness of said first bearing layer is preferably in the range between approximately 0.003 mm and 0.01 mm (0.00012 and 0.0004 inch).

14. A composite bearing according to claim 12 wherein said bearing metal alloy has a Vickers hardness in the range between approximately 600 and 900.

15. A composite bearing according to claim 12, characterized in that the said first bearing layer comprises at least for the most part of intermetallic compounds between nickel and tin.

16. A composite bearing according to claim 12 wherein said tin content is preferably 65% to 70%.

17. A composite bearing according to claim 12, characterized in that the said additional surface layer as a running-in layer has a thickness in the range between 0.005 mm and 0.015 mm (0.0002 to 0.0006 inch).

18. A composite bearing according to claim 12, characterized in that the said additional surface layer as a running-in layer selected from the group consisting of lead and an alloy with lead, tin and cadmium as its main ingredient and has a Vickers hardness (Diamond Pyramid Hardness) in the range between approximately 5 and 10.

19. A composite bearing according to claim 12, characterized in that the said additional surface layer as a running-in layer comprises lead, up to 20% tin or indium and with a maximum of 6% copper.

* * * * *